United States Patent
Zheng

(10) Patent No.: US 8,347,163 B2
(45) Date of Patent: Jan. 1, 2013

(54) SYSTEM AND METHOD FOR DATA TRANSMISSION

(75) Inventor: Yan-Xiu Zheng, Shulin (TW)

(73) Assignee: Industrial Technology Research Institute, Hsinchu (TW)

( * ) Notice: Subject to any disclaimer, the term of this patent is extended or adjusted under 35 U.S.C. 154(b) by 792 days.

(21) Appl. No.: 12/491,612

(22) Filed: Jun. 25, 2009

(65) Prior Publication Data
US 2010/0037115 A1    Feb. 11, 2010

Related U.S. Application Data

(60) Provisional application No. 61/087,231, filed on Aug. 8, 2008, provisional application No. 61/093,609, filed on Sep. 2, 2008.

(51) Int. Cl.
*H04L 1/18* (2006.01)
*G08C 25/02* (2006.01)

(52) U.S. Cl. ..................................... 714/748

(58) Field of Classification Search .............. 714/746, 714/748–750
See application file for complete search history.

(56) References Cited

U.S. PATENT DOCUMENTS

| | | | |
|---|---|---|---|
| 6,700,867 B2 | 3/2004 | Classon et al. | |
| 6,977,888 B1 | 12/2005 | Frenger et al. | |
| 7,003,709 B2 | 2/2006 | Wengerter et al. | |
| 7,286,540 B2 * | 10/2007 | Kim et al. | 370/394 |
| 7,369,499 B2 | 5/2008 | Gruhn et al. | |
| 8,060,801 B2 * | 11/2011 | Seol et al. | 714/748 |
| 2006/0092869 A1 | 5/2006 | Herrmann | |
| 2006/0282739 A1 * | 12/2006 | Meyer et al. | 714/748 |
| 2007/0183451 A1 | 8/2007 | Lohr et al. | |
| 2007/0189206 A1 | 8/2007 | Chandra et al. | |
| 2008/0039145 A1 | 2/2008 | Ishii et al. | |
| 2008/0133995 A1 | 6/2008 | Lohr et al. | |
| 2008/0276147 A1 * | 11/2008 | Gho et al. | 714/748 |

FOREIGN PATENT DOCUMENTS

| | | |
|---|---|---|
| CN | 1422032 | 6/2003 |
| EP | 1 501 232 A1 | 1/2005 |
| EP | 1 901 471 A2 | 3/2008 |

OTHER PUBLICATIONS

Office Action for Chinese Patent Application No. 200910166017.3, from the Chinese Patent Office, dated May 25, 2011.

* cited by examiner

*Primary Examiner* — Shelly A Chase
(74) *Attorney, Agent, or Firm* — Finnegan, Henderson, Farabow, Garrett & Dunner, LLP

(57) ABSTRACT

A method for a receiver to receive data from a transmitter, the receiver including a plurality of buffers to support data retransmission by the transmitter. The method includes: receiving a data packet from the transmitter; determining whether or not at least a predetermined number of buffers are in use; and notifying the transmitter if it is determined that at least the predetermined number of buffers are in use.

22 Claims, 19 Drawing Sheets

200

| Number of Buffers In Use | 0 | 1 | 2 | 3 | 4 | 5 | 6 |
|---|---|---|---|---|---|---|---|
| Probability | 0.53 | 0.35 | 0.098 | 0.015 | 0.0012 | $5.4 \times 10^{-5}$ | $10^{-6}$ |

|  | HSDPA | IEEE 802.16e |
|---|---|---|
| Conventional Data Transmission Processes 300 | Throughput= 10.057Mbps | Throughput= 2.95Mbps |
| Data Transmission Processes 800 | Throughput= 14.876Mbps | Throughput= 4.36Mbps |
|  | Throughput Gain=47.92% | Throughput Gain=47.8% |
|  | Buffer Saving=32.39% | Buffer Saving=32.39% |
| Data Transmission Processes 1000 | Throughput= 15.2947Mbps | Throughput= 4.48Mbps |
|  | Throughput Gain=52.08% | Throughput Gain=51.86% |
|  | Buffer Saving=34.25% | Buffer Saving =34.25% |

Fig. 11

SYSTEM AND METHOD FOR DATA TRANSMISSION

RELATED APPLICATIONS

This application is based upon and claims the benefit of priority from U.S. Provisional Patent Application Nos. 61/087,231, filed Aug. 8, 2008, and 61/093,609, filed Sep. 2, 2008, the entire contents of which are incorporated herein by reference.

TECHNICAL FIELD

This disclosure relates to systems and methods for data transmission in a communication system.

BACKGROUND

Traditionally, a communication system may use data retransmission schemes for data transmission. FIG. 1 illustrates a block diagram of a conventional communication system 100 using a hybrid automatic repeat request (HARQ) scheme for data retransmission. The communication system 100 includes a transmitter 102 and a receiver 104. The transmitter 102 may transmit data to the receiver 104 on a plurality of HARQ channels, e.g., N HARQ channels. The receiver 104 includes a memory device 106, which further includes a plurality of buffers, e.g., N buffers 106-1, ..., 106-N, to support data transmission on the N HARQ channels, respectively.

For example, based on the HARQ scheme, the transmitter 102 transmits a first data packet in a HARQ process to the receiver 104 on the first HARQ channel. The receiver 104 receives the first data packet and decodes the first data packet to obtain decoded data. The receiver 104 further verifies the decoded data by an error detection check, e.g., cyclic redundancy check (CRC). If the receiver 104 determines that the decoded data passes the verification, the decoded data is outputted. The receiver 104 further sends an acknowledgment signal ACK to the transmitter 102, to notify the transmitter 102 that the decoded data passes the verification. Accordingly, the HARQ process is finished.

If the receiver 104 determines that the decoded data fails the verification, the receiver 104 stores the first data packet in a buffer, e.g., the buffer 106-1, and sends a non-acknowledgment signal NACK to the transmitter 102, to notify the transmitter 102 that the decoded data fails the verification. In response, the transmitter 102 transmits a retransmission data packet to the receiver 104. The retransmission data packet may be the same as the first data packet or contain error correction information for the first data packet.

After receiving the retransmission data packet, the receiver 104 combines the retransmission data packet and the first data packet stored in the buffer 106-1 to obtain decoded data. The receiver 104 further verifies the decoded data by CRC. If the receiver 104 determines that the decoded data fails the verification, the receiver 104 stores the retransmission data packet in the buffer 106-1, together with the first data packet, and sends the non-acknowledgment signal NACK to the transmitter 102, to notify the transmitter 102 that the decoded data fails the verification. Accordingly, the transmitter 102 transmits a next retransmission data packet to the receiver 104. The above steps may then be repeated, until the decoded data passes the verification, and the HARQ process is finished.

Typically, a plurality of HARQ processes, e.g., N HARQ processes, are performed between the transmitter 102 and the receiver 104 in each schedule interval, and each of the N HARQ processes is performed on one of the N HARQ channels. Conventionally, for each of the N HARQ channels, the receiver 104 needs a buffer to store data packets when the decoded data fails the verification. Accordingly, the receiver 104 needs N buffers, i.e., the buffers 106-1, ..., 106-N, for the N HARQ channels, respectively. If the number of HARQ channels is relatively large, a size of each buffer will be relatively small, since the memory device 106 usually has a fixed size. As a result, there may be a buffer constraint on data transmission and throughput of the communication system 100 may decrease.

However, in reality, the chance is relatively small that decoded data on all the N HARQ channels fails the verification. In other words, the chance is relatively small that all the N buffers are in use simultaneously. For example, FIG. 2 is a table 200 showing probabilities of a number of buffers in use, when the communication system 100 (FIG. 1) includes six HARQ channels and, accordingly, the receiver 104 (FIG. 1) includes six buffers. It is assumed that an error rate for each data packet is 0.1. As suggested by the table 200, the probability that two or less of the six buffers are in use is more than 97%. This means that, at most, two of the six buffers are in use most of the time during data transmission.

FIG. 3 illustrates conventional data transmission processes 300 performed by the communication system 100 (FIG. 1) based on the HARQ scheme. It is assumed that the communication system 100 (FIG. 1) includes four HARQ channels and the receiver 104 (FIG. 1) includes four buffers respectively for the four HARQ channels.

Referring to FIGS. 1 and 3, each signal received by the transmitter 102 from the receiver 104 is represented by a small block with letter "A," or "N," which correspond to the signal ACK or NACK, respectively. Each data packet is represented by a rectangular block with a first part labeled with "Old Payload" or "New Payload," and a second part labeled with "CRC." The first part of the rectangular block indicates whether a data packet is a first data packet in a HARQ process and, hence, including a new payload, or a retransmission data packet in a HARQ process and, hence, including an old payload. The second part of the rectangular block indicates that a data packet includes a CRC code for performing verification at the receiver 104. Although the data packets in each schedule interval T1, T2, or T3 are shown to be aligned according to time in FIG. 3, it is to be understood that the data packets in each schedule interval are sequentially transmitted from the transmitter 102 to the receiver 104.

As shown in FIG. 3, on each HARQ channel, if the transmitter 102 receives the acknowledgment signal ACK from the receiver 104 in a current schedule interval, the transmitter 102 transmits a new payload to the receiver 104 in a next schedule interval. If the transmitter 102 receives the non-acknowledgment signal NACK from the receiver 104 in a current schedule interval, the transmitter 102 transmits an old payload to the receiver 104 in a next schedule interval.

SUMMARY

According to the present disclosure, there is provided a method for a receiver to receive data from a transmitter, the receiver including a plurality of buffers to support data retransmission by the transmitter, the method comprising: receiving a data packet from the transmitter; determining whether or not at least a predetermined number of buffers are in use; and notifying the transmitter if it is determined that at least the predetermined number of buffers are in use.

According to the present disclosure, there is provided a method for a transmitter to transmit data to a receiver, the transmitter being configured to perform data retransmission, the method comprising: transmitting a first data packet to the receiver in a first schedule interval; receiving a notification signal from the receiver; and determining, based on the received notification signal, whether or not to transmit a second data packet in a second schedule interval after the first schedule interval.

According to the present disclosure, there is provided a receiver for receiving data from a transmitter configured to perform data retransmission, comprising: a plurality of buffers; and a processor, the processor being configured to: store a data packet received from the transmitter in one of the plurality of buffers; determine whether or not at least a predetermined number of buffers are in use; and notify the transmitter if it is determined that at least the predetermined number of buffers are in use.

According to the present disclosure, there is provided a transmitter for transmitting data to a receiver, the receiver being configured to send a notification signal based on a number of buffers in use by the receiver, the transmitter comprising: a processor configured to determine whether or not to transmit a data packet in a schedule interval, based on the notification signal received from the receiver.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIG. 2 is a table showing probabilities of a number of buffers in use.

FIG. 11 shows a table providing a system throughput comparison, according to an exemplary embodiment.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

In exemplary embodiments, there are provided systems and methods for performing data transmission based on the hybrid automatic repeat request (HARQ) scheme. The systems and methods may reduce buffer constraint on data transmission and therefore improve system throughput. The systems may operate in accordance with different standards, including, e.g., the IEEE 802.16 family of standards, the 3rd Generation Partnership Project (3GPP) standard, the High-Speed Packet Access (HSPA) standard, the Long Term Evolution (LTE) standard, the International Mobile Telecommunications-2000 (IMT-2000) standard, the IMT-Advance standard, the IMT family of standards, etc.

Figure 4:
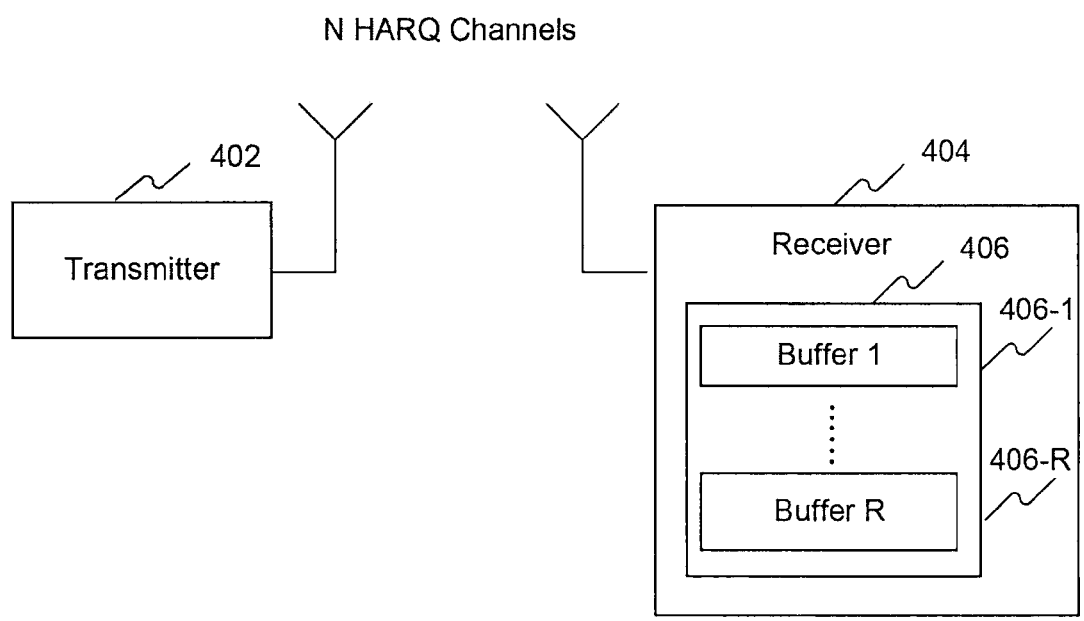
FIG. 4 illustrates a block diagram of a communication system for performing data transmission based on the HARQ scheme, according to an exemplary embodiment.

FIG. 4 illustrates a block diagram of a communication system 400 for performing data transmission based on the HARQ scheme, according to an exemplary embodiment. The communication system 400 includes a transmitter 402 and a receiver 404. The transmitter 402 is configured to transmit data to the receiver 404 on a plurality of HARQ channels, e.g., N HARQ channels.

In exemplary embodiments, the receiver 404 includes a memory device 406, which further includes a plurality of buffers, e.g., buffers 406-1, . . . , 406-R, to support data transmission on the N HARQ channels. In particular, the number of the buffers in the memory device 406 is less than the number of the HARQ channels, i.e., R<N. The communication system 400 is configured to perform data transmission consistent with the data transmission methods described below.

Figure 5:
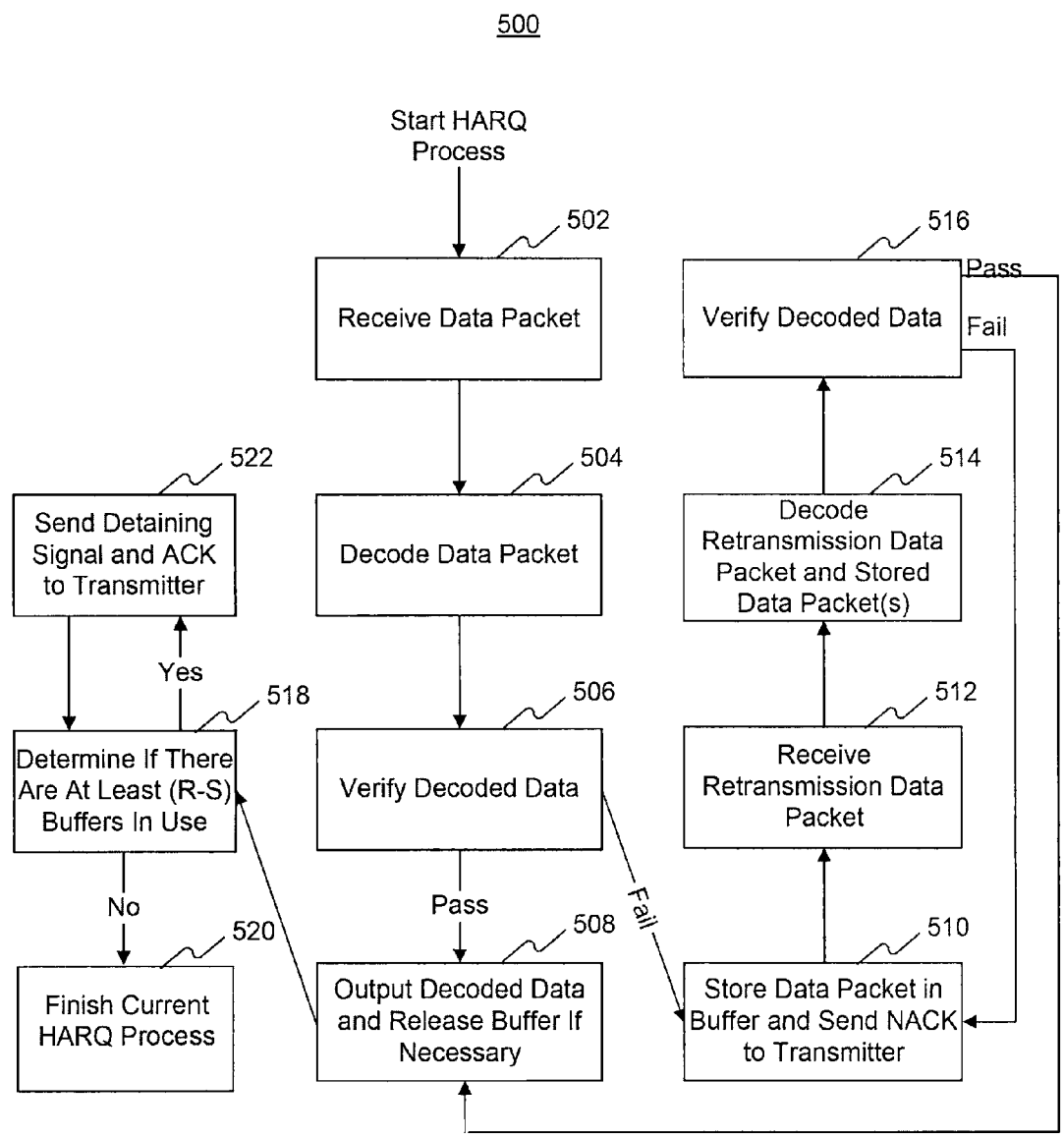
FIG. 5 illustrates a flowchart of a method for a communication system to perform data transmission, according to an exemplary embodiment.

FIG. 5 illustrates a flowchart of a method 500 for the communication system 400 (FIG. 4) to perform data transmission, according to an exemplary embodiment. As noted above, the transmitter 402 is configured to transmit data to the receiver 404 on N HARQ channels. For convenience of illustration, a HARQ process on a first one of the N HARQ channels is shown to explain the method 500.

Referring to FIGS. 4 and 5, the receiver 404 receives a first data packet from the transmitter 402 in a first schedule interval (502). The receiver 404 decodes the first data packet to obtain decoded data (504). The receiver 404 further verifies the decoded data based on an error detection check, e.g., cyclic redundancy check (CRC) (506). If the receiver 404 determines that the decoded data passes the verification (506—Pass), the decoded data is outputted (508).

If the receiver 404 determines that the decoded data fails the verification (506—Fail), the receiver 404 stores the first data packet in an available buffer in the memory device 406, e.g., the buffer 406-1, and sends a non-acknowledgement signal NACK to the transmitter 402, to notify the transmitter 402 that the decoded data fails the verification (510). Accordingly, the transmitter 402 transmits a retransmission data packet to the receiver 404 in a next schedule interval. The retransmission data packet may be the same as the first data packet or contain error correction information for the first data packet.

The receiver 404 receives the retransmission data packet (512). The receiver 404 may further decode the retransmission data packet together with the data packet(s) stored in the buffer 406-1 (514). Currently, only the first data packet is stored in the buffer 406-1. Therefore, the receiver 404 decodes the retransmission data packet together with first data packet. As a result, the receiver 404 obtains decoded data based on the first data packet and the retransmission data packet.

The receiver 404 further verifies the decoded data based on, e.g., CRC (516). If the receiver 404 determines that the decoded data passes the verification (516—Pass), the decoded data is outputted, and the receiver 404 releases the buffer 406-1 for future use (508). If the decoded data fails the verification (516—Fail), steps 510-516 are repeated, until the receiver 404 determines that the decoded data passes the verification.

After the decoded data passes verification and is outputted (508), the receiver 404 determines if there are at least a predetermined number of buffers, e.g., R-S buffers, in use. In other words, the receiver 404 determines if there are at most S buffers available and not in use. If the receiver 404 determines that there are less than the predetermined number of buffers in use (518—No), the receiver 404 may send an acknowledgment signal ACK to the transmitter 402, to notify the transmitter 402 that the decoded data passes the verification. Accordingly, the current HARQ process is finished (520).

If the receiver 404 determines that there are at least the predetermined number of buffers in use (518—Yes), the receiver 404 sends a detaining signal to the transmitter 402, to notify the transmitter 402 not to transmit a data packet in a next schedule interval on the present HARQ channel (522). In other words, the receiver 404 notifies the transmitter 402 not to start a new HARQ process on the present HARQ channel in the next schedule interval. In addition, the receiver 404 may send an acknowledgment signal ACK to the transmitter 402, to notify the transmitter 402 that the decoded data passes the verification. Step 518 is then repeated, until the receiver 404 determines that there are less than the predetermined number of buffers in use.

Figure 6:
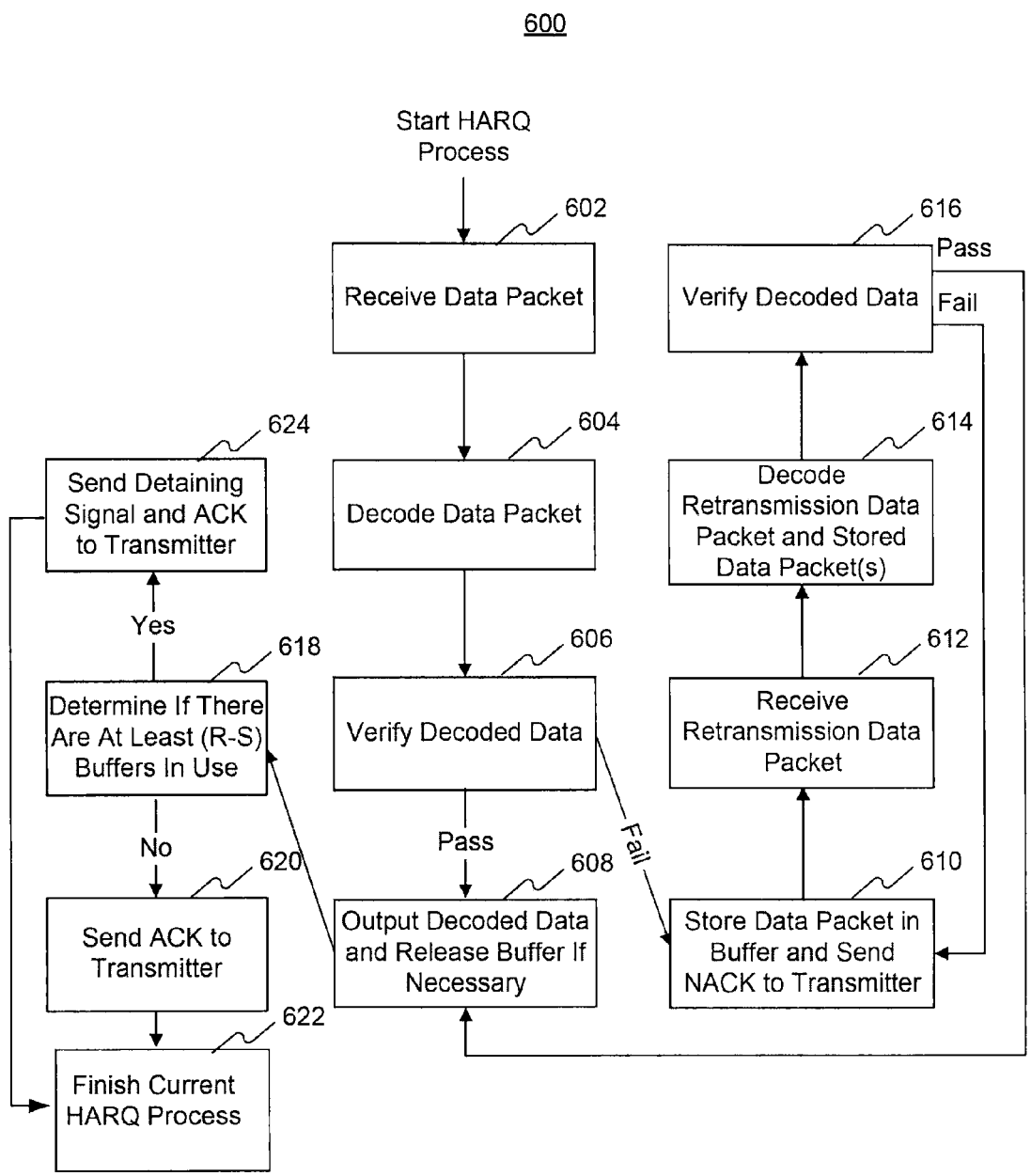
FIG. 6 illustrates a flowchart of a method for a communication system to perform data transmission, according to an exemplary embodiment.

FIG. 6 illustrates a flowchart of a method 600 for the communication system 400 (FIG. 4) to perform data transmission, according to an exemplary embodiment. As noted above, the transmitter 402 is configured to transmit data to the receiver 404 on N HARQ channels. For convenience of illustration, a HARQ process on a first one of the N HARQ channels is shown to explain the method 600.

Referring to FIGS. 4 and 6, steps 602-616 are substantially the same as steps 502-516 (FIG. 5), respectively, and are not described in detail. After the decoded data passes verification and is outputted (608), the receiver 404 determines if there are at least a predetermined number of buffers, e.g., R-S buffers, in use. In other words, the receiver 404 determines if there are at most S buffers available and not in use. If the receiver 404 determines that there are less than the predetermined number of buffers in use (618—No), the receiver 404 sends an acknowledgment signal ACK to the transmitter 402, to notify the transmitter 402 that the decoded data passes the verification (620). Accordingly, the current HARQ process is finished (622).

If the receiver 404 determines that there are at least the predetermined number of buffers in use (618—Yes), the receiver 404 sends a detaining signal to the transmitter 402, to notify the transmitter 402 not to transmit a data packet in a next schedule interval on the present HARQ channel (624). In other words, different from the method 500 (FIG. 5), the receiver 404 notifies the transmitter 402 not to start a new HARQ process on the present HARQ channel only in the next schedule interval. In addition, the receiver 404 may send an acknowledgment signal ACK to the transmitter 402, to notify the transmitter 402 that the decoded data passes the verification. Accordingly, the current HARQ process is finished (622).

For example, if the receiver 404 determines that there are at least the predetermined number of buffers in use, the receiver 404 sends the detaining signal to the transmitter 402, to notify the transmitter 402 that there are insufficient buffers at the receiver 404. As noted above, the transmitter 402 is configured to transmit data to the receiver 404 on N HARQ channels. Accordingly, the transmitter 402 may halt the transmission of one or more HARQ processes on one or more of the N HARQ channels, possibly including unfinished HARQ processes. When sufficient buffers become available at the receiver 404, i.e., when there are less than the predetermined number of buffers in use, the transmitter 402 increases the number of HARQ processes and the associated throughput.

In one exemplary embodiment, the detaining signal may be transmitted on a control channel to a HARQ ACK/NACK feedback channel, on which the signals ACK or NACK are transmitted. Transmission of the detaining signal may be delayed to wait for an opportunity to transmit.

In another exemplary embodiment, when the decoded data passes verification and there are at least the predetermined number of buffers in use, the receiver 404 may only send a detaining signal to the transmitter 402, without sending an acknowledgement signal ACK. In other words, the sending of the detaining signal may replace the HARQ ACK feedback to carry both the information that there are insufficient buffers at the receiver 404 and the information that the decoded data passes verification.

Figure 7:
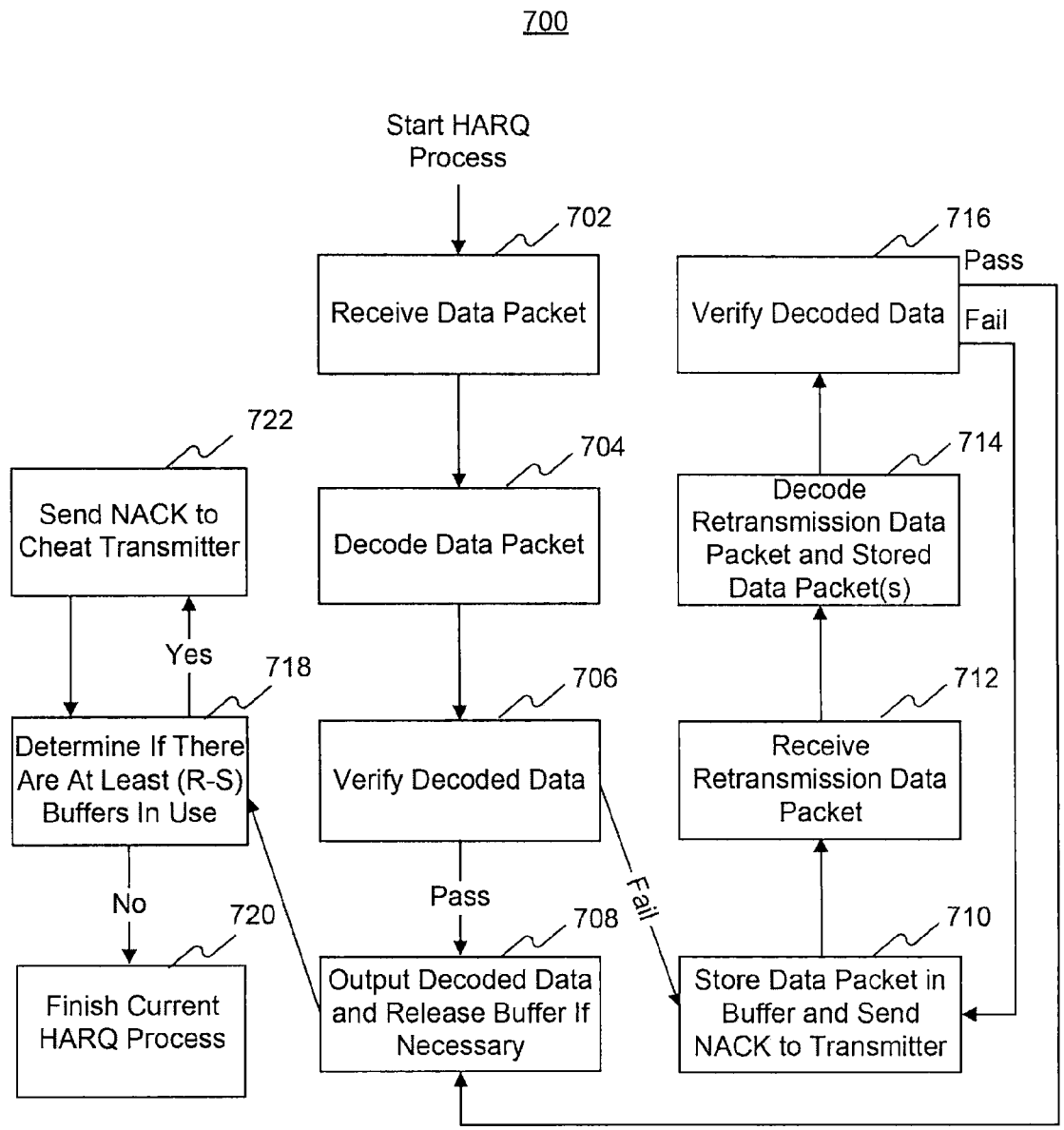
FIG. 7 illustrates a flowchart of a method for a communication system to perform data transmission, according to an exemplary embodiment.

FIG. 7 illustrates a flowchart of a method 700 for the communication system 400 (FIG. 4) to perform data transmission, according to an exemplary embodiment. As noted above, the transmitter 402 is configured to transmit data to the receiver 404 on N HARQ channels. For convenience of illustration, a HARQ process on a first one of the N HARQ channels is shown to explain the method 700.

Referring to FIGS. 4 and 7, steps 702-716 are substantially the same as steps 502-516 (FIG. 5), respectively, and are not described in detail. After the decoded data passes verification and is outputted (708), the receiver 404 determines if there are at least a predetermined number of buffers, e.g., R-S buffers, in use. In other words, the receiver 404 determines if there are at most S buffers available and not in use. If the receiver 404 determines that there are less than the predetermined number of buffers in use (718—No), the transmitter 402 may send an acknowledgment signal ACK to the transmitter 402, to notify the transmitter 402 that the decoded data passes the verification. Accordingly, the current HARQ process is finished (720).

If the receiver 404 determines that there are at least the predetermined number of buffers in use (718—Yes), the receiver 404 sends a non-acknowledgment signal NACK to the transmitter 402, to deceive the transmitter 402 that the decoded data fails the verification, in order to prevent the transmitter 402 from starting a new HARQ process on the present HARQ channel (722).

Accordingly, the transmitter 402 may transmit a retransmission data packet to the receiver 404 in a next schedule interval. However, in fact, the decoded data has passed the verification, and the receiver 404 does not need the retransmission data packet. In such manner, the transmitter 402 may be prevented from starting a new HARQ process on the present HARQ channel. Step 718 is then repeated, until the receiver 404 determines that there are less than the predetermined number of buffers in use. Accordingly, the current HARQ process is finished (720).

In exemplary embodiments, a buffer outage may occur, that is, a buffer may become full, during a data transmission process. If a buffer outage occurs to a buffer such as the buffer 406-1 (FIG. 4), one of the data packets already stored in the buffer 406-1 may be discarded, so that the buffer 406-1 can continue to store a next retransmission data packet. For example, when the receiver 404 uses a chase combining HARQ scheme, the first one of the data packets stored in the buffer 406-1 may be discarded. Also for example, when the receiver 404 uses an incremental redundancy HARQ scheme, the second one of the data packets stored in the buffer 406-1 may be discarded.

Figure 8:
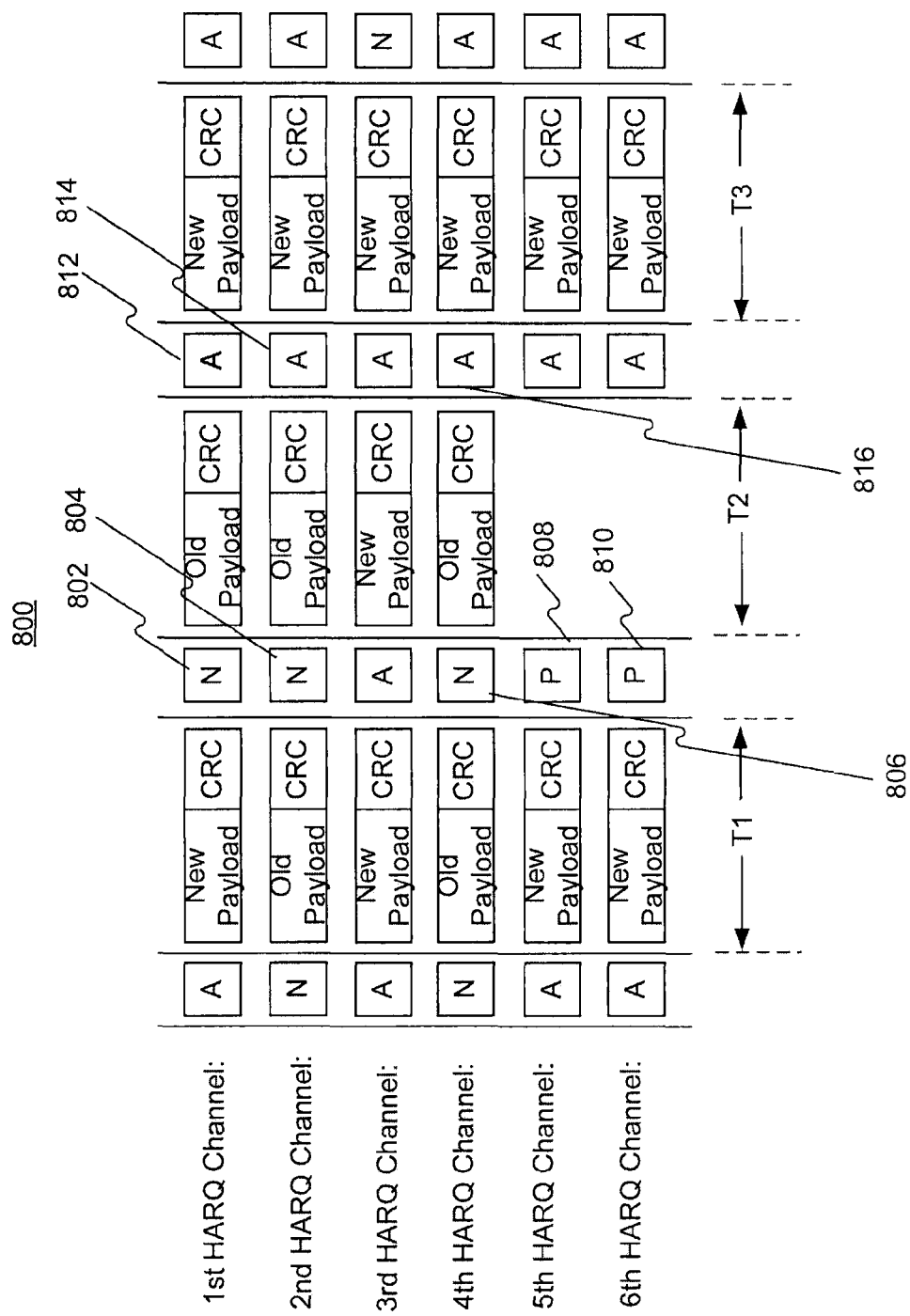
FIG. 8 illustrates data transmission processes performed by a communication system, according to an exemplary embodiment.

FIG. 8 illustrates data transmission processes 800 performed by the communication system 400 (FIG. 4) using the method 500 (FIG. 5) or 600 (FIG. 6), according to an exemplary embodiment. For convenience of illustration, it is assumed that the transmitter 402 (FIG. 4) is configured to transmit data to the receiver 404 (FIG. 4) on six HARQ channels, i.e., N=6, and the memory device 406 (FIG. 4) includes four buffers, i.e., R=4. It is further assumed that if the receiver 404 determines that there are at least three of the four buffers in use, i.e., R−S=3 or S=1, the receiver 404 sends a detaining signal to the transmitter 402.

Referring to FIGS. 4 and 8, each signal received by the transmitter 402 from the receiver 404 is represented by a small block with letter "A," "N." or "P." which correspond to an acknowledgment signal ACK, a non-acknowledgment signal NACK, or a detaining signal, respectively. Each data packet is represented by a rectangular block with a first part labeled with "Old Payload" or "New Payload," and a second part labeled with "CRC." The first part of the rectangular block indicates whether a data packet is a first data packet in a HARQ process and, hence, including a new payload, or a retransmission data packet in a HARQ process and, hence, including an old payload. The second part of the rectangular block indicates that a data packet includes a CRC code for performing verification at the receiver 404. Although the data packets in each schedule interval T1, T2, or T3 are aligned according to time in FIG. 8, it is to be understood that the data packets in each schedule interval are sequentially transmitted from the transmitter 402 to the receiver 404.

In the illustrated embodiment, the transmitter 402 transmits one data packet on each of the six HARQ channels during the schedule interval T1. However, decoded data fails the verification by the receiver 404 on the first, second, and fourth HARQ channels. Therefore the transmitter 402 receives from the receiver 404 non-acknowledgement signals NACK 802, 804, and 806 on the first, second, and fourth HARQ channels, respectively. Since each of the first, second, and fourth HARQ channels needs a buffer to store received data packets, three of the four buffers in the memory device 406 are in use. Accordingly, the receiver 404 sends detaining signals 808 and 810 on the fifth and sixth HARQ channels, respectively, to notify the transmitter 402 not to transmit data packets on the fifth and sixth HARQ channels for the schedule interval T2. As a result, the transmitter 402 stops data transmission on the fifth and sixth HARQ channels in the schedule interval T2.

Figure 1:
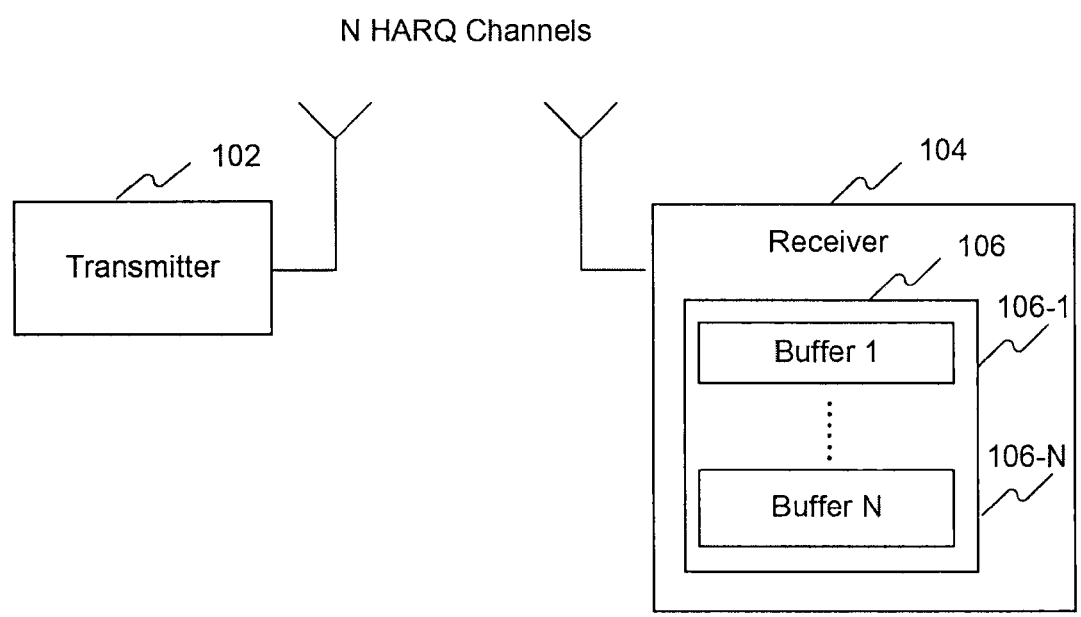
FIG. 1 illustrates a block diagram of a conventional communication system for performing data transmission based on a hybrid automatic repeat request (HARQ) scheme.
Figure 3:
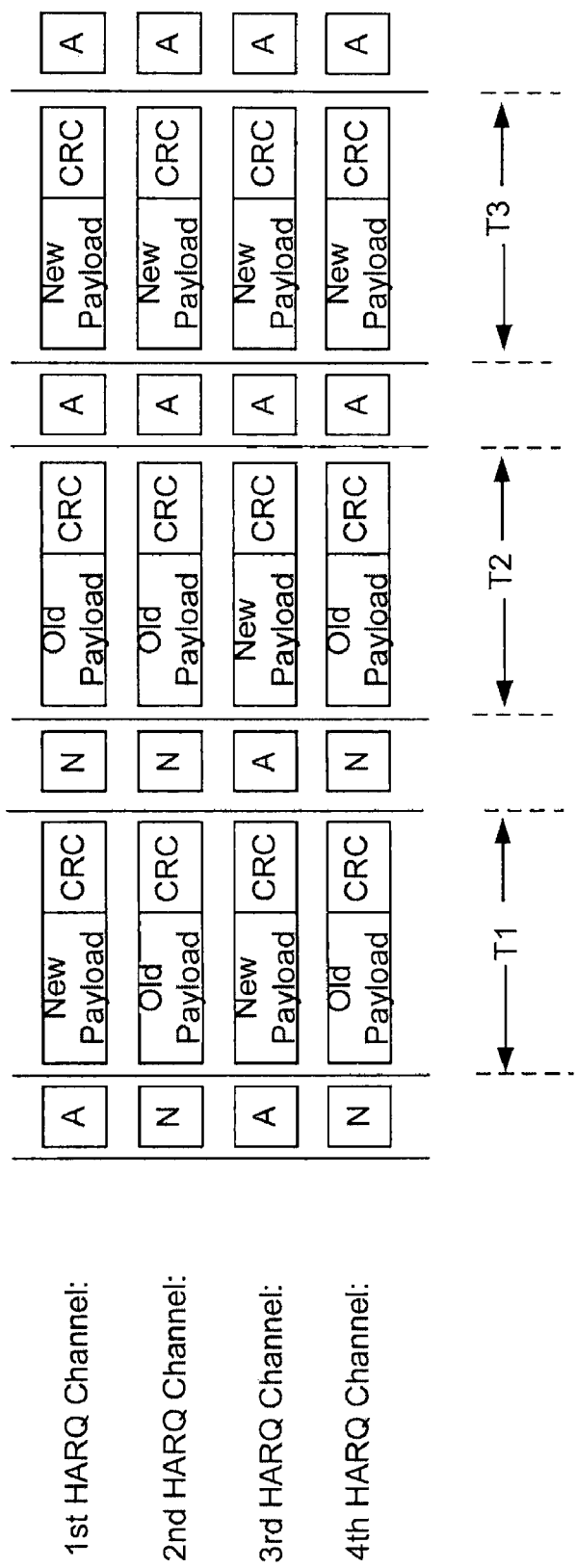
FIG. 3 illustrates conventional data transmission processes performed by a communication system based on the HARQ scheme.

In the schedule interval T2, the decoded data on each of the first, second, and fourth HARQ channels passes the verification by the receiver 404, as indicated by acknowledgement signals ACK 812, 814, and 816 transmitted from the receiver 404 to the transmitter 402. Therefore, the receiver 404 releases the first, second, and fourth buffers used for the first, second, and fourth HARQ channels, and all of the four buffers in the memory device 406 become available. In addition, in the schedule interval T2, the receiver 404 sends an acknowledgement signal ACK to the transmitter 402 on each of the fifth and sixth HARQ channels. As a result, in the schedule interval T3, the transmitter 402 may transmit data on all the six HARQ channels. Compared to the data transmission processes 300 (FIG. 3), more decoded data passes the verification by the receiver 404 in the data transmission processes 800. Accordingly, the data transmission processes 800 may improve system throughput.

In exemplary embodiments, more than one HARQ process may be transmitted on each HARQ channel. For example, data transmitted in one HARQ process on a HARQ channel may be further divided to be transmitted in multiple HARQ processes on the HARQ channel. A chance that the decoded data in all the multiple HARQ processes fails the verification by the receiver may decrease as a number of the multiple HARQ processes increases. As a result, buffer constraint on data transmission may be reduced.

Figure 9:
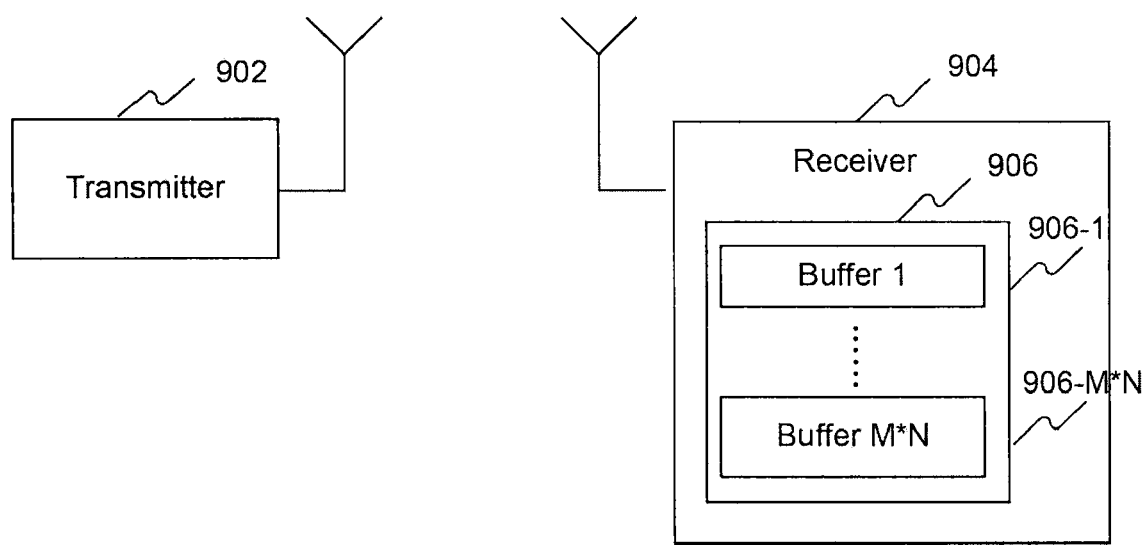
FIG. 9 illustrates a block diagram of a communication system for performing data transmission based on the HARQ scheme, according to an exemplary embodiment.

FIG. 9 illustrates a block diagram of a communication system 900 for performing data transmission based on the HARQ scheme, according to an exemplary embodiment. The communication system 900 includes a transmitter 902 and a receiver 904. The transmitter 902 is configured to transmit data to the receiver 904 on a plurality of HARQ channels, e.g., N HARQ channels, and each of the HARQ channels includes a plurality of HARQ processes, e.g., M HARQ processes.

In exemplary embodiments, the receiver 904 includes a memory device 906, which further includes a plurality of buffers, e.g., buffers 906-1, . . . , **906-M*N**, to support data transmission on the N HARQ channels. In the illustrated embodiments, the same number of HARQ processes, i.e., M HARQ processes, are transmitted on each of the N HARQ channels. However, it is to be understood that a different number of HARQ processes may also be transmitted on each of the N HARQ channels.

In exemplary embodiments, the communication system 900 may also be configured to perform data transmission consistent with the above-described data transmission method 500 (FIG. 5), 600 (FIG. 6), or 700 (FIG. 7). When the communication system 900 is so configured, the memory device 906 may include L buffers (not shown), where L<N*M.

Figure 10:
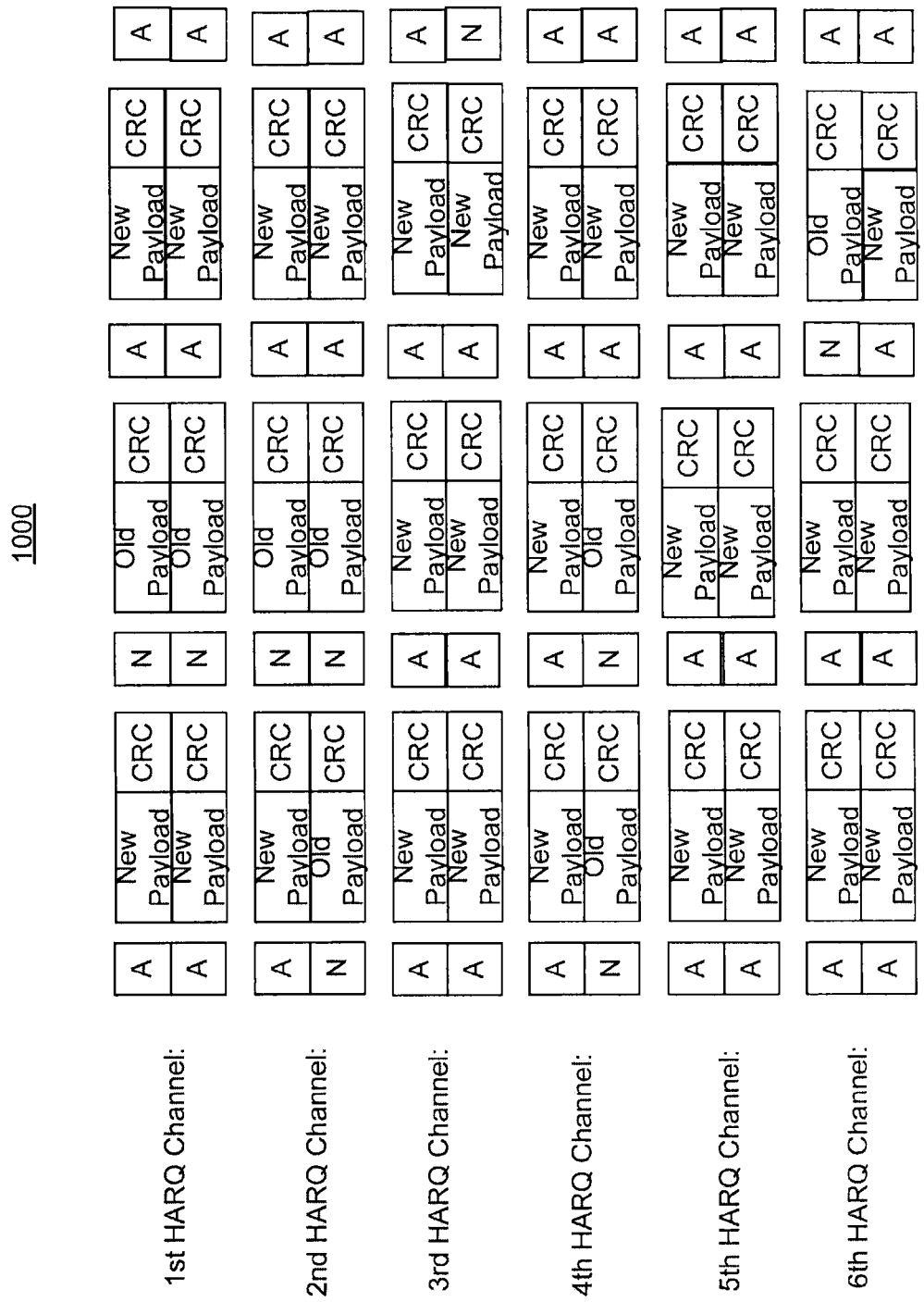
FIG. 10 illustrates data transmission processes performed by a communication system, according to an exemplary embodiment.

FIG. 10 illustrates data transmission processes 1000 when the communication system 900 (FIG. 9) is configured to perform data transmission consistent with the data transmission method 500 (FIG. 5) or 600 (FIG. 6), according to an exemplary embodiment. For convenience of illustration, it is assumed that the transmitter 902 (FIG. 9) is configured to transmit data to the receiver 904 (FIG. 9) on six HARQ channels, i.e., N=6, and two HARQ processes are transmitted on each of six HARQ channels, i.e., M=2. It is also assumed that the memory device 906 includes eight buffers, i.e., L=8. It is further assumed that if the receiver 904 determines there are at least six buffers in use, the receiver 904 sends a detaining signal to the transmitter 902.

Referring to FIGS. 9 and 10, each signal received by the transmitter 902 from the receiver 904 is represented by a small block with letter "A," or "N," which corresponds to an acknowledgment signal ACK or a non-acknowledgment signal NACK, respectively. Each data packet is represented by a rectangular block with a first part labeled with "Old Payload" or "New Payload," and a second part labeled with "CRC." The first part of the rectangular block indicates whether a data packet is a first data packet in a HARQ process and, hence, including a new payload, or a retransmission data packet in a HARQ process and, hence, including an old payload. The second part of the rectangular block indicates that a data packet includes a CRC code for performing the verification at the receiver 904.

In the illustrated embodiment, a size of each of the buffers in the memory device 906 is assumed to be one-half of a size of each of the buffers in the memory device 406 (FIG. 4). Compared to the data transmission processes 800 (FIG. 8), more decoded data passes the verification by the receiver 904 in the data transmission processes 1000. Accordingly, the data transmission processes 1000 may further improve system throughput. In addition, the data transmission processes 1000 may also increase a data transmission rate for the transmitter 902, and save radio resources.

FIG. 11 shows a table 1100 providing a system throughput comparison of the conventional data transmission processes 300 (FIG. 3), the data transmission processes 800 (FIG. 8), and the data transmission processes 1000 (FIG. 10), according to an exemplary embodiment. The comparison is based on results of simulations using parameters for the High-Speed Downlink Packet Access (HSDPA) standard and parameters for the IEEE 802.16e standard. As shown in the table 1100, buffer constraint on data transmission is reduced, and system throughput is improved in the data transmission processes 800 and 1000.

In exemplary embodiments, the communication system 400 (FIG. 4) or 900 (FIG. 9) may perform the above-described data transmission methods in a synchronous manner. For example, in the synchronous manner, the receiver 404 or 904 may send signals ACK or NACK, or detaining signals to the transmitter 402 or 902 at fixed times.

Figure 12:
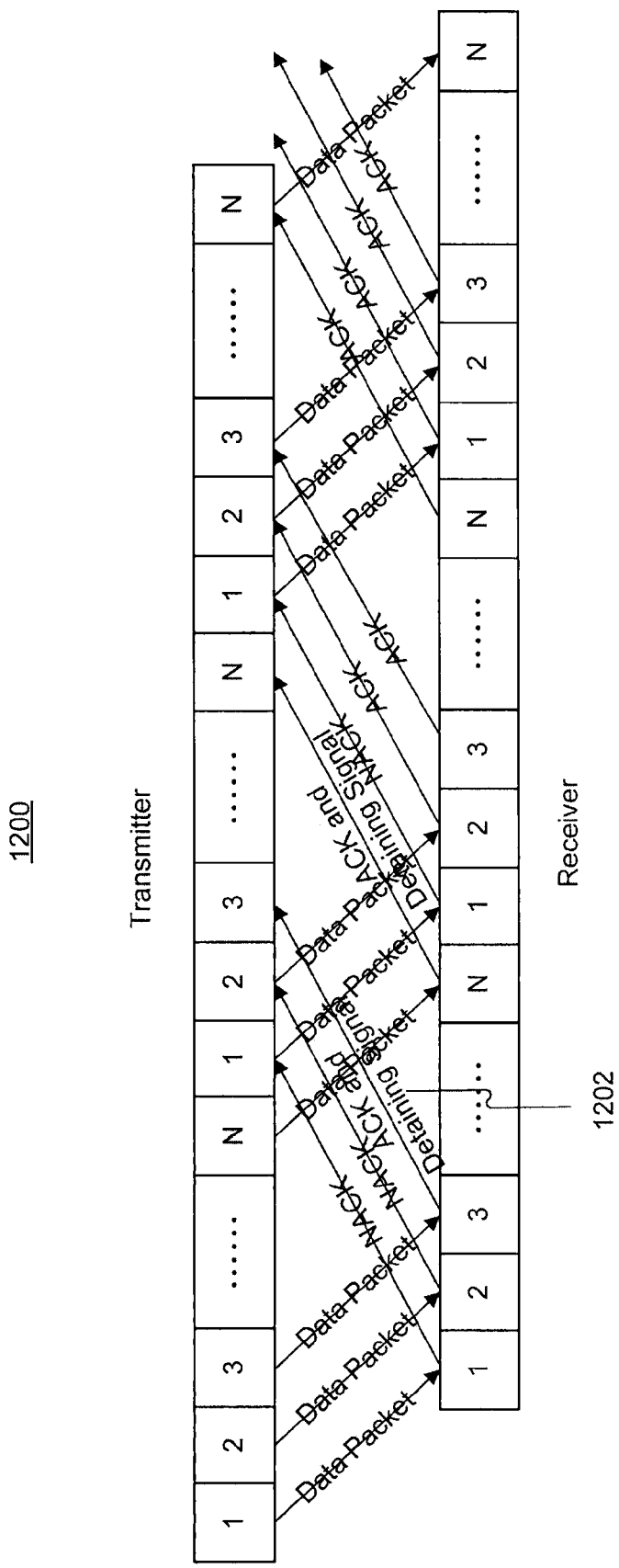
FIG. 12 shows a time sequence diagram, according to an exemplary embodiment.

FIG. 12 shows a time sequence diagram 1200 when the communication system 400 (FIG. 4) performs the method 500 (FIG. 5) in a synchronous manner, according to an exemplary embodiment. Referring to FIGS. 4 and 12, the transmitter 402 transmits data to the receiver 404 on N HARQ channels, each represented by a small block with a number indicating a channel index in FIG. 12. In the illustrated embodiment, when the transmitter 402 receives a detaining signal 1202 on the third HARQ channel, which suggests that there are at least a predetermined number of buffers in the memory device 406 in use, the transmitter 402 stops data transmission on the third HARQ channel until there are less than the predetermined number of buffers in use. In other words, the transmitter 402 becomes idle on the third HARQ channel until less than the predetermined number of buffers are in use.

Figure 13:
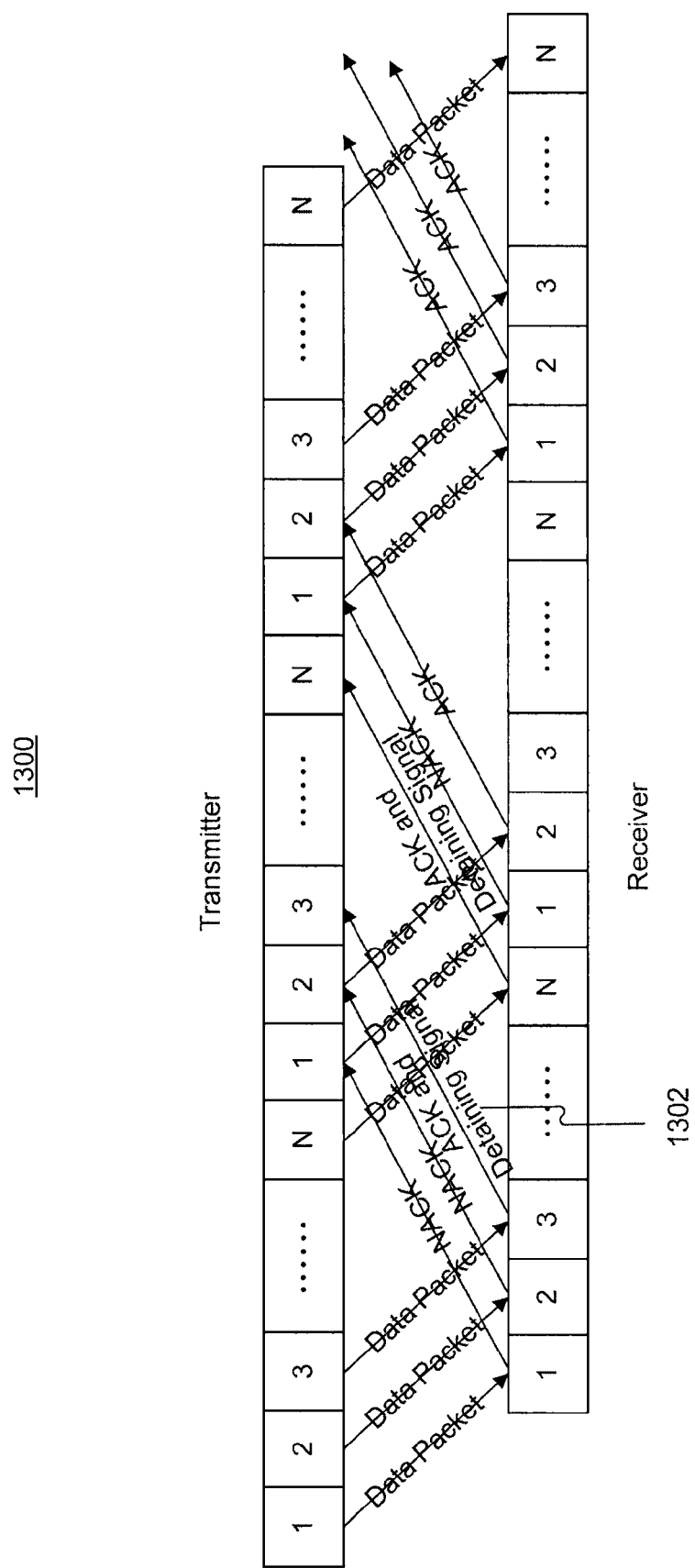
FIG. 13 shows a time sequence diagram, according to an exemplary embodiment.

FIG. 13 shows a time sequence diagram 1300 when the communication system 400 (FIG. 4) performs the method 600 (FIG. 6) in a synchronous manner, according to an exemplary embodiment. Referring to FIGS. 4 and 13, the transmitter 402 transmits data to the receiver 404 on N HARQ channels, each represented by a small block with a number indicating a channel index in FIG. 13. In the illustrated embodiment, when the transmitter 402 receives a detaining signal 1302 on the third HARQ channel, the transmitter 402 stops data transmission on the third HARQ channel for one schedule interval. In other words, the transmitter 402 becomes idle on the third HARQ channel for one schedule interval. The transmitter 402 then resumes data transmission on the third HARQ channel after the one schedule interval.

Figure 14:
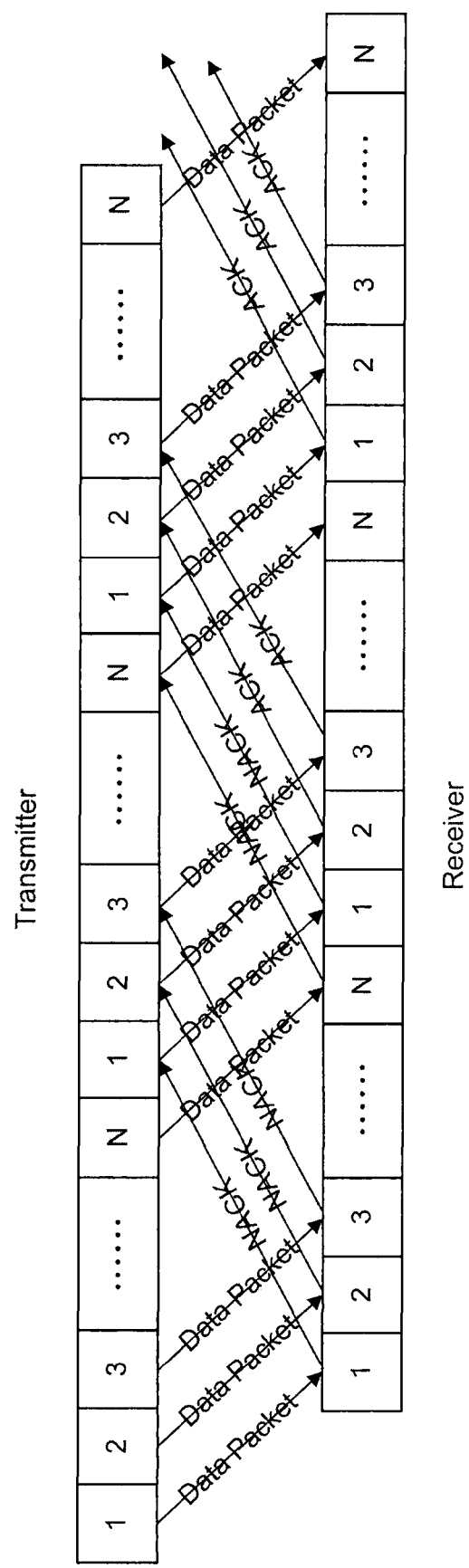
FIG. 14 shows a time sequence diagram, according to an exemplary embodiment.

FIG. 14 shows a time sequence diagram 1400 when the communication system 400 (FIG. 4) performs the method 700 (FIG. 7) in a synchronous manner, according to an exemplary embodiment. Referring to FIGS. 4 and 14, the transmitter 402 transmits data to the receiver 404 on N HARQ channels, each represented by a small block with a number indicating a channel index in FIG. 14. In the illustrated embodiment, when the transmitter 402 receives a non-acknowledgment signal NACK, the transmitter 402 transmits a retransmission data packet for a current HARQ process. As explained above, the receiver 404 sends the non-acknowledgment signal NACK to deceive the transmitter 402 that the decoded data fails verification, in order to prevent the transmitter 402 from starting a new HARQ process on the present HARQ channel. When the transmitter 402 receives an acknowledgment signal ACK, the transmitter 402 starts a new HARQ process.

In exemplary embodiments, the methods 500 (FIG. 5), 600 (FIG. 6), and 700 (FIG. 7) may be performed by the communication system 400 (FIG. 4) or 900 (FIG. 9) in an asynchronous manner. In the asynchronous manner, the transmitter 402 or 902 may freely choose waiting time to receive the signal ACK or NACK, or the detaining signal. The transmitter 402 or 902 may further determine when to start a new HARQ process.

In exemplary embodiments, the methods 500 (FIG. 5), 600 (FIG. 6), and 700 (FIG. 7) may be used when system throughput is equal to or larger than a predetermined threshold. When the system throughput is less than the predetermined threshold, the methods 500 (FIG. 5), 600 (FIG. 6), or 700 (FIG. 7) may not be used and, hence, detaining signaling may be avoided. In other words, the methods 500 (FIG. 5), 600 (FIG. 6), and 700 (FIG. 7) may be used to reduce buffer outage when the system throughput is relatively high.

Figure 15:
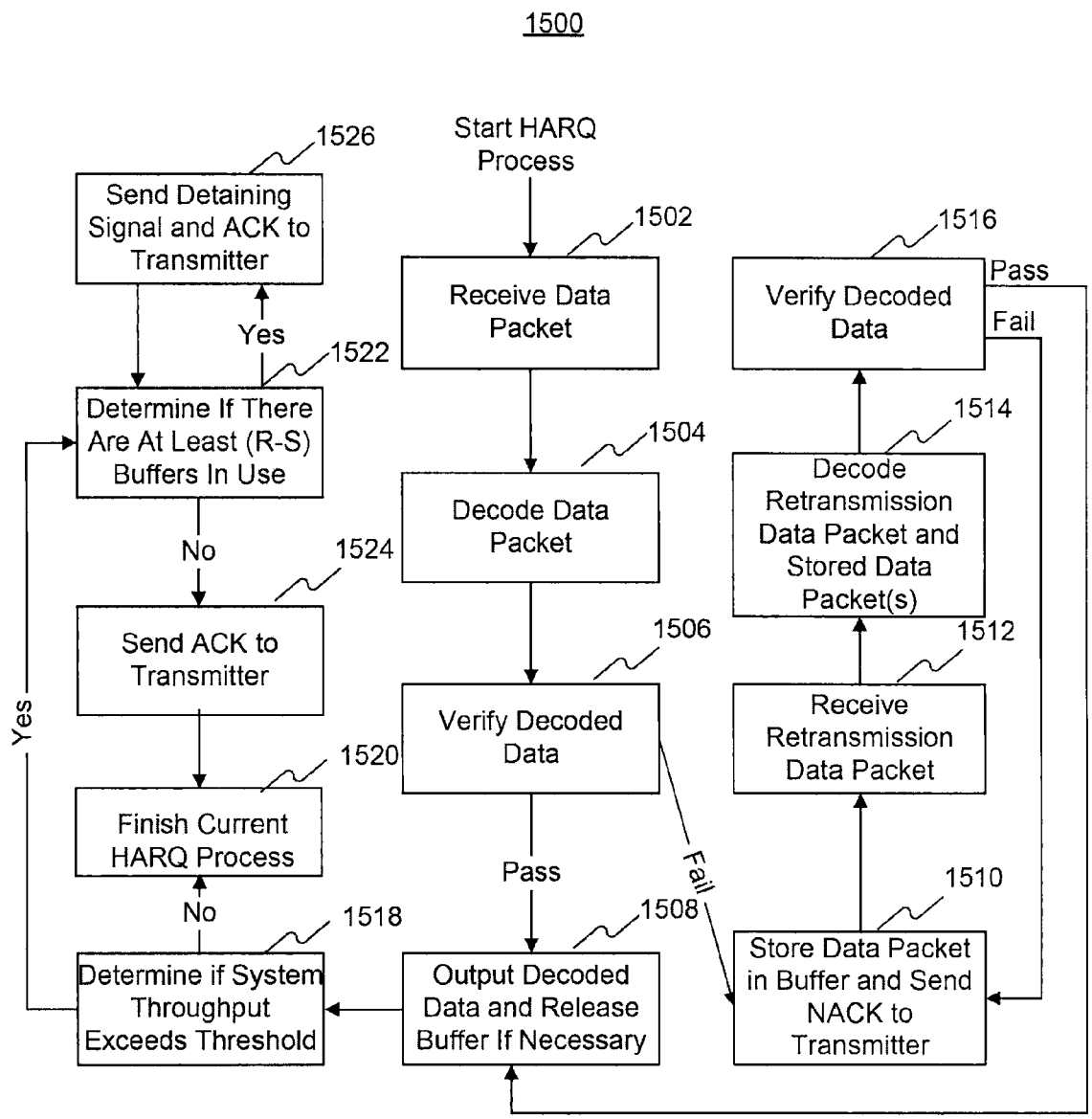
FIG. 15 illustrates a flowchart of a method for a communication system to perform data transmission, according to an exemplary embodiment.

FIG. 15 illustrates a flowchart of a method 1500 for the communication system 400 (FIG. 4) to perform data transmission, according to an exemplary embodiment. As noted above, the transmitter 402 is configured to transmit data to the receiver 404 on N HARQ channels. For convenience of illustration, a HARQ process on a first one of the N HARQ channels is shown to explain the method 1500.

Referring to FIGS. 4 and 15, steps 1502-1516 are substantially the same as steps 502-516 (FIG. 5), respectively, and are not described in detail. After decoded data passes verification and is outputted (1508), the receiver 404 determines if system throughput is equal to or larger than a predetermined threshold (1518). If the receiver 404 determines that the system throughput is less than the predetermined threshold (1518—No), the current HARQ process is finished (1520).

If the receiver 404 determines that the system throughput is equal to or larger than the predetermined threshold (1518—Yes), the receiver 404 further determines if there are at least a predetermined number of buffers, e.g., R-S buffers, in use (1522). In other words, the receiver 404 determines if there are at most S buffers available and not in use. If the receiver 404 determines that there are less than the predetermined number of buffers in use (1522—No), the receiver 404 sends an acknowledgment signal ACK to the transmitter 402 (1524), to notify the transmitter 402 that the decoded data passes the verification. Accordingly, the current HARQ process is finished (1520).

If the receiver 404 determines that there are at least the predetermined number of buffers in use (1522—Yes), the receiver 404 sends a detaining signal to the transmitter 402, to notify the transmitter 402 not to transmit a data packet on the present HARQ channel in a next schedule interval (1526). In other words, the receiver 404 notifies the transmitter 402 not to start a new HARQ process on the present HARQ channel in the next schedule interval. In addition, the receiver 404 sends an acknowledgment signal ACK to the transmitter 402, to notify the transmitter 402 that the decoded data passes the verification. Step 1526 is then repeated, until the receiver 404 determines that there are less than the predetermined number of buffers in use.

In exemplary embodiments, dropping signaling may be used by the receiver 404 (FIG. 4) to notify the transmitter 402 (FIG. 4) that a received data packet for a HARQ process is dropped at the receiver 404. As a result, the transmitter 402 may restart the HARQ process or resend the dropped data packet, in order to prevent HARQ failure due to buffer outage. For example, there is a chance that a relatively large number of HARQ processes fail the verification by the receiver 404. If the number of the HARQ processes that fail the verification is larger than the number of buffers in the memory device 406, buffer outage occurs. In such a situation, dropping signaling may be used by the receiver 404 to request the transmitter 402 to drop a current HARQ process and reinitiate a new HARQ process in a next schedule interval.

Figure 16:
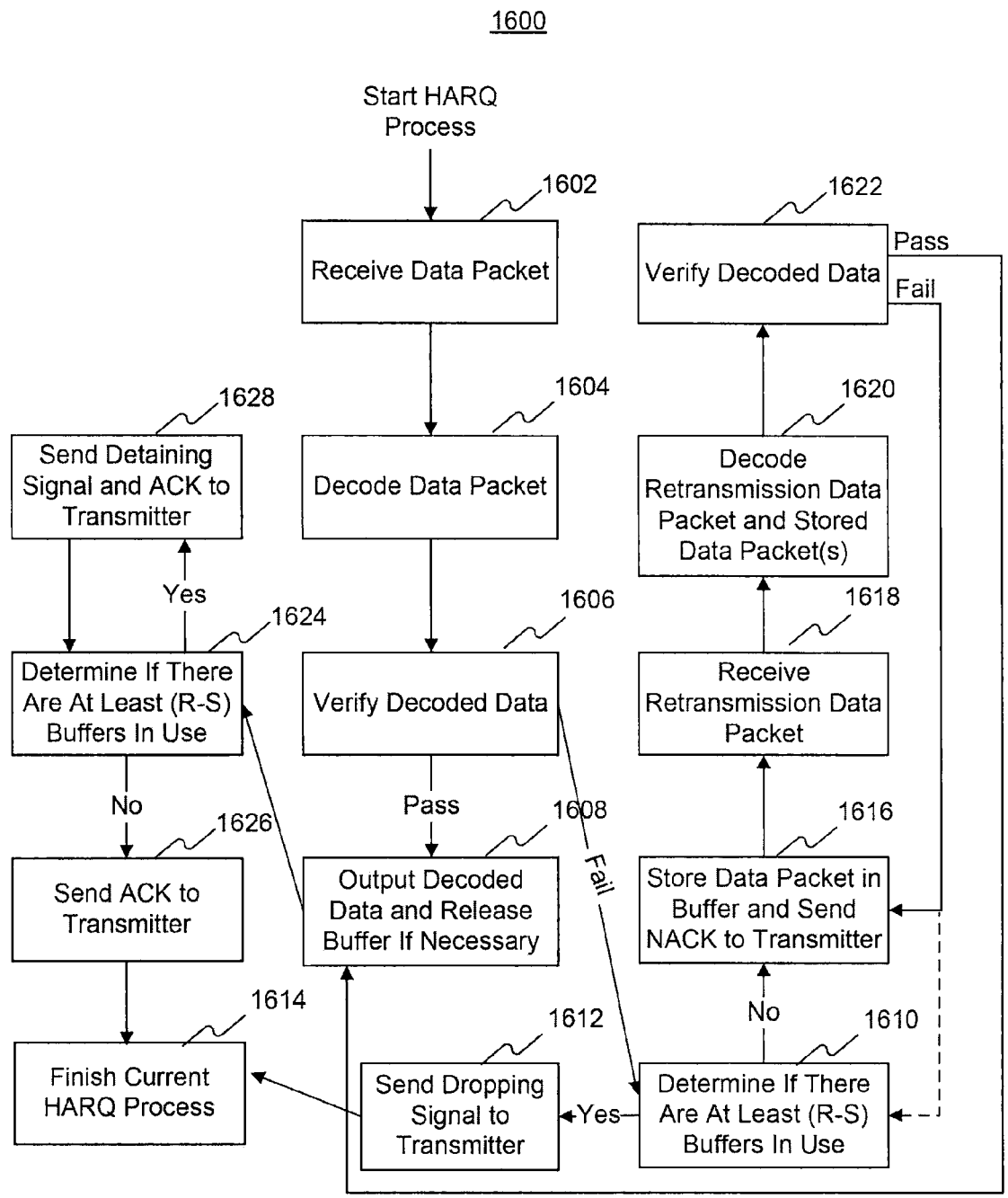
FIG. 16 illustrates a flowchart of a method for a communication system to perform data transmission, according to an exemplary embodiment.

FIG. 16 illustrates a flowchart of a method 1600 for the communication system 400 (FIG. 4) to perform data transmission, according to an exemplary embodiment. As noted above, the transmitter 402 is configured to transmit data to the receiver 404 on N HARQ channels. For convenience of illustration, a HARQ process on a first one of the N HARQ channels is shown to explain the method 1600.

Referring to FIGS. 4 and 16, the receiver 404 receives a first data packet from the transmitter 402 in a first schedule interval (1602). The receiver 404 decodes the first data packet to obtain decoded data (1604). The receiver 404 further verifies the decoded data based on error detection check, e.g., CRC (1606). If the decoded data passes the verification (1606—Pass), the decoded data is outputted (1608).

If the decoded data fails the verification (1606—Fail), the receiver 404 determines if there are at least a predetermined number of buffers, e.g., R-S buffers, in use (1610). If the receiver 404 determines that there are at least the predetermined number of buffers in use (1610—Yes), the receiver 404 sends a dropping signal to the transmitter 402, to notify the transmitter 402 to drop the current HARQ process (1612). Accordingly, the current HARQ process is finished (1614).

If the receiver 404 determines that there are less than the predetermined number of buffers in use (1610—No), the receiver 404 stores the first data packet in an available buffer in the memory device 406, e.g., the buffer 406-1, and sends a non-acknowledgement signal NACK to the transmitter 402, to notify the transmitter 402 that the decoded data fails the verification (1616). Accordingly, the transmitter 402 transmits a retransmission data packet to the receiver 404 in a next schedule interval. The retransmission data packet may be the same as the first data packet or contain error correction information for the first data packet.

The receiver 404 receives the retransmission data packet (1618). The receiver 404 further decodes the retransmission data packet together with the data packet(s) stored in the buffer 406-1 (1620). Currently, only the first data packet is stored in the buffer 406-1. Therefore, the receiver 404 decodes the retransmission data packet together with first data packet. As a result, the receiver 404 obtains decoded data based on the first data packet and the retransmission data packet.

The receiver 404 further verifies the decoded data based on, e.g., CRC (1622). If the receiver 404 determines that the decoded data passes the verification (1622—Pass), the decoded data is outputted, and the receiver 404 releases the buffer 406-1 for future use (1608). If the decoded data fails the verification (1622—Fail), steps 1616-1622 are repeated, until the receiver 404 determines that the decoded data passes the verification. Additionally, referring to the broken line path, the receiver 404 may determine if at least the predetermined number of buffers are in use (1610), each time before the receiver 404 stores a retransmission data packet in the buffer 406-1 and sends a non-acknowledgment signal NACK to the transmitter 402 (1616).

After the decoded data is outputted (1608), the receiver 404 determines if there are at least the predetermined number of buffers, e.g., R-S buffers, in use (1624). If the receiver 404 determines that there are less than the predetermined number of buffers in use (1624—No), the transmitter 402 may send an acknowledgment signal ACK to the transmitter 402, to notify the transmitter 402 that the decoded data passes the verification (1626). Accordingly, the current HARQ process is finished (1614).

If the receiver 404 determines that there are at least the predetermined number of buffers in use (1624—Yes), the receiver 404 sends a detaining signal to the transmitter 402, to notify the transmitter 402 not to transmit a data packet on the present HARQ channel in a next schedule interval (1628). In other words, the receiver 404 notifies the transmitter 402 not to start a new HARQ process on the present HARQ channel in the next schedule interval. In addition, the receiver 404 sends an acknowledgment signal ACK to the transmitter 402, to notify the transmitter 402 that the decoded data passes the verification. Step 1624 is then repeated, until the receiver 404 determines that there are less than the predetermined number of buffers in use.

Figure 17:
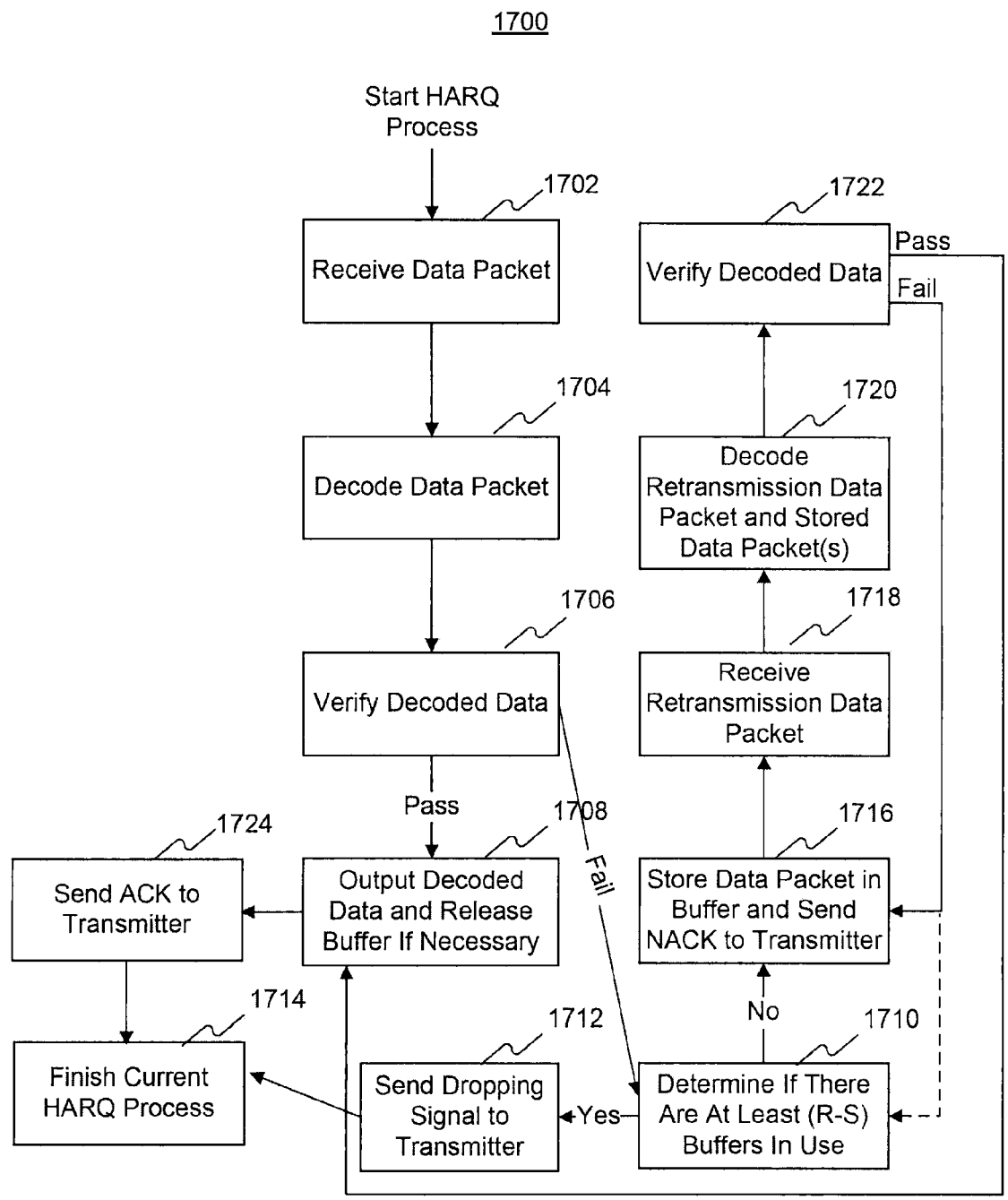
FIG. 17 illustrates a flowchart of a method for a communication system to perform data transmission, according to an exemplary embodiment.

In exemplary embodiments, detaining signaling may not be needed for data transmission. FIG. 17 illustrates a flowchart of a method 1700 for the communication system 400 (FIG. 4) to perform data transmission without use of a detaining signaling, according to an exemplary embodiment. As noted above, the transmitter 402 is configured to transmit data to the receiver 404 on N HARQ channels. For convenience of illustration, a HARQ process on a first one of the N HARQ channels is shown to explain the method 1700.

In exemplary embodiments, the transmitter 402 may configure the receiver 404 to send two-state HARQ feedback, i.e., to send an acknowledgement signal ACK or a non-acknowledgement signal NACK. Additionally, the transmitter 402 may also configure the receiver 404 to send three-state HARQ feedback, i.e., to send an acknowledgement signal ACK, a non-acknowledgement signal NACK, or a dropping signal. The transmitter 402 may evaluate if a total transmission rate exceeds a predetermined threshold. If the transmitter 402 determines that the total transmission rate exceeds the predetermined threshold, the transmitter 402 may configure the receiver 404 to send the three-state HARQ feedback. If the transmitter 402 determines that the total transmission rate does not exceed the predetermined threshold, the transmitter 402 may configure the receiver 404 to send the two-state HARQ feedback.

Referring to FIGS. 4 and 17, steps 1702-1722 are substantially the same as steps 1602-1622 (FIG. 16), respectively, and are not described in detail. After the decoded data passes the verification and is outputted (1708), the receiver 404 sends an acknowledgment signal ACK to the transmitter 402, to notify the transmitter 402 that the decoded data passes the verification (1724). Accordingly, the current HARQ process is finished (1714).

While the methods 1500 (FIG. 15), 1600 (FIG. 16), and 1700 (FIG. 17) have been described based on the communication system 400 (FIG. 4), these methods may be practiced with equal effectiveness with the communication system 900 (FIG. 9).

In addition, buffers may be created by virtually partitioning a memory device based on the size of each HARQ process.

Also consistent with disclosed embodiments, detaining signaling, dropping signaling, and the predetermined threshold may be adapted to an existing HARQ scheme or modified versions thereof.

Figure 18:
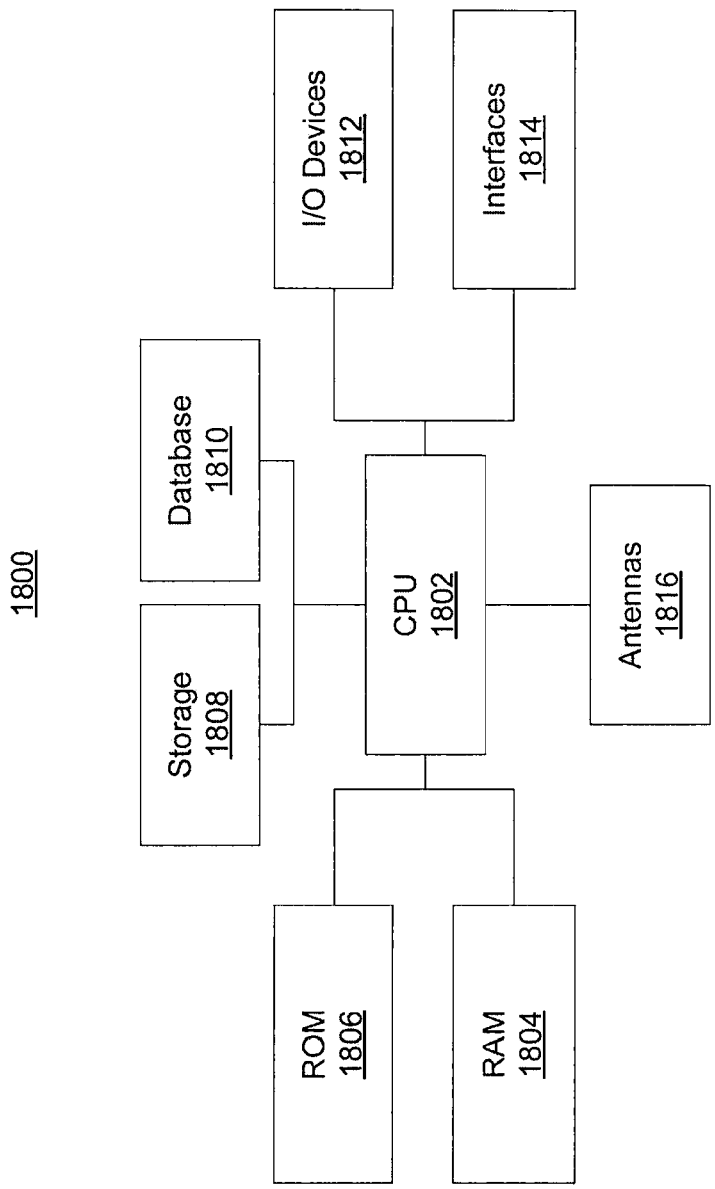
FIG. 18 illustrates a block diagram of a transmitter, according to an exemplary embodiment.

FIG. 18 illustrates a block diagram of a transmitter 1800, according to an exemplary embodiment. For example, the transmitter 1800 may be the transmitter noted above in explanation of the embodiments in FIGS. 4-17. Referring to FIG. 18, the transmitter 1800 may include one or more of the following components: at least one central processing unit (CPU) 1802 configured to execute computer program instructions to perform various processes and methods, random access memory (RAM) 1804 and read only memory (ROM) 1806 configured to access and store information and computer program instructions, storage 1808 to store data and information, databases 1810 to store tables, lists, or other data structures, I/O devices 1812, interfaces 1814, antennas 1816, etc. Each of these components is well-known in the art and will not be discussed further.

Figure 19:
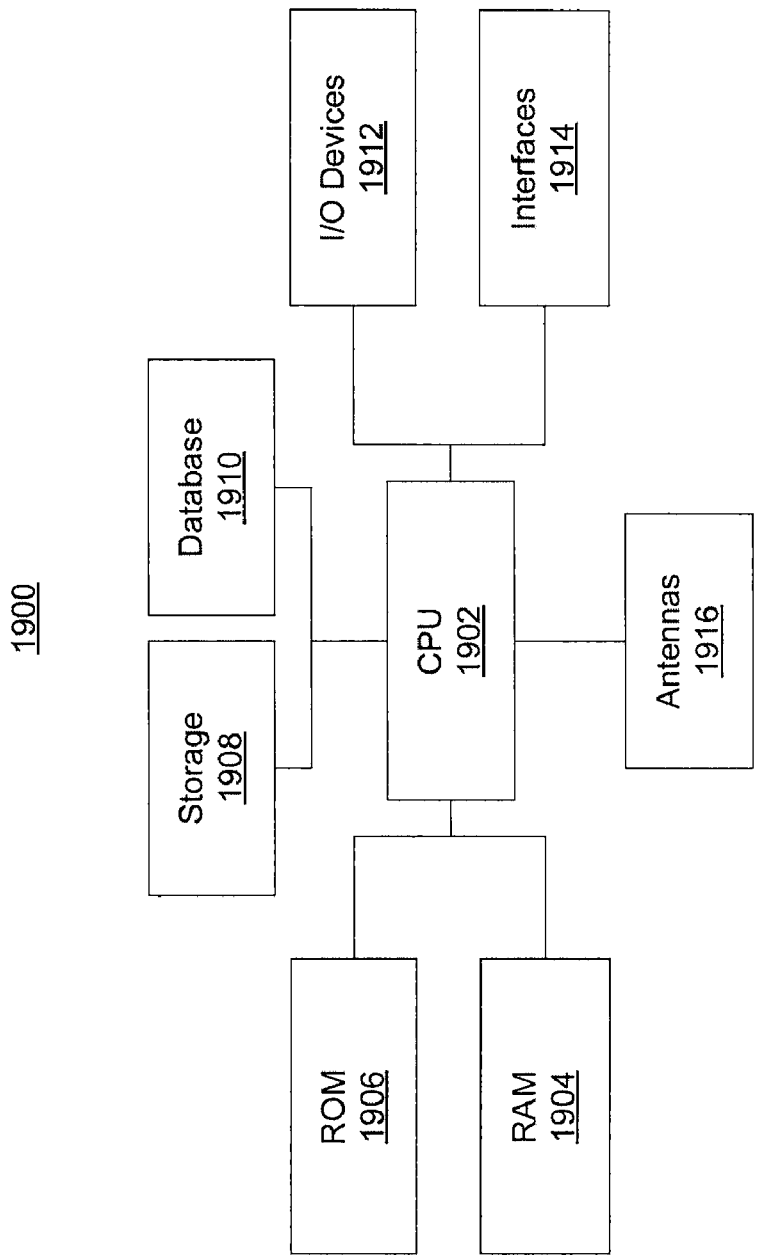
FIG. 19 illustrates a block diagram of a receiver, according to an exemplary embodiment.

FIG. 19 illustrates a block diagram of a receiver 1900, according to an exemplary embodiment. For example, the receiver 1900 may be the receiver noted above in explanation of the embodiments in FIGS. 4-17. Referring to FIG. 19, the receiver 1900 may include one or more of the following components: at least one central processing unit (CPU) 1902 configured to execute computer program instructions to perform various processes and methods, random access memory (RAM) 1904 and read only memory (ROM) 1906 configured to access and store information and computer program instructions, storage 1908 to store data and information, databases 1910 to store tables, lists, or other data structures, I/O devices 1912, interfaces 1914, antennas 1916, etc. Each of these components is well-known in the art and will not be discussed further.

While embodiments have been described based on the HARQ scheme, the invention is not so limited. It may be practiced with equal effectiveness with other data retransmission schemes.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a receiver to receive data from a transmitter, the receiver including a plurality of buffers to support data retransmission by the transmitter, the method comprising:
   receiving a data packet of a plurality of data packets from the transmitter;
   determining whether or not at least a predetermined number of buffers are in use; and
   notifying the transmitter if it is determined that at least the predetermined number of buffers are in use,
   wherein the plurality of buffers are insufficient to store the plurality of data packets.

2. The method of claim 1, wherein the receiving comprises:
   receiving the data packet based on a hybrid automatic repeat request (HARQ) scheme.

3. The method of claim 1, wherein the data packet is a first data packet, the method further comprising:
   receiving a retransmission data packet from the transmitter, the retransmission data packet being the same as the first data packet or containing error correction information for the first data packet.

4. The method of claim 1, further comprising:
   decoding the received data packet to obtain decoded data; and
   verifying the decoded data by error detection check.

5. The method of claim 4, wherein the verifying further comprises:
   verifying the decoded data by cyclic redundancy check.

6. The method of claim 4, wherein when the decoded data fails the verification, the method further comprises:
   storing the received data packet in one of the plurality of buffers; and
   sending a non-acknowledgment signal to the transmitter, to notify the transmitter that the decoded data fails the verification.

7. The method of claim 4, wherein when the decoded data passes the verification, the notifying further comprises:
   sending an acknowledgement signal to the transmitter, to notify the transmitter that the decoded data passes the verification.

8. The method of claim 4, wherein when the decoded data passes the verification, the notifying further comprises:
   sending a non-acknowledgment signal to the transmitter, to deceive the transmitter that the decoded data fails the verification.

9. The method of claim 1, wherein the data packet is transmitted by the transmitter in a first schedule interval, the notifying further comprising:
   sending a detaining signal to the transmitter, to notify the transmitter not to start a new data transmission process in a second schedule interval after the first schedule interval.

10. The method of claim 1, wherein the data packet is transmitted by the transmitter in a first schedule interval, the notifying further comprising:
    sending a detaining signal to the transmitter, to notify the transmitter not to transmit a new data packet for a new data transmission process in a second schedule interval after the first schedule interval.

11. The method of claim 1, wherein the data packet is transmitted by the transmitter for a current data transmission process, the notifying further comprising:
sending a dropping signal to the transmitter, to notify the transmitter that the received data packet is dropped at the receiver.

12. The method of claim 1, wherein the data packet is transmitted by the transmitter for a current data transmission process, the notifying further comprising:
sending a dropping signal to the transmitter, to notify the transmitter to drop the current data transmission process.

13. The method of claim 1, wherein the data packet is transmitted by the transmitter for a current data transmission process, the notifying further comprising:
sending a dropping signal to the transmitter, to notify the transmitter to reinitiate a new data transmission process.

14. A method for a transmitter to transmit data to a receiver, the transmitter being configured to perform data retransmission, the method comprising:
transmitting a first data packet of a plurality of data packets to the receiver in a first schedule interval;
receiving a notification signal from the receiver; and
determining, based on the received notification signal, whether or not to transmit a second data packet in a second schedule interval after the first schedule interval,
wherein the receiver includes insufficient buffers to store the plurality of data packets.

15. The method of claim 14, wherein the transmitting comprises:
transmitting the first data packet based on a hybrid automatic repeat request (HARQ) scheme.

16. The method of claim 14, furthering comprising:
transmitting the second data packet, the second data packet being the same as the first data packet or containing error correction information for the first data packet.

17. The method of claim 14, wherein the determining further comprises:
determining not to start a new data transmission process in the second schedule interval.

18. The method of claim 14, wherein the transmitter transmits the first data packet for a current data transmission process, the determining further comprising:
determining to drop the current data transmission process.

19. The method of claim 14, wherein the transmitter transmits the first data packet for a current data transmission process, the determining further comprising:
determining to restart the current data transmission process.

20. A receiver for receiving data from a transmitter configured to perform data retransmission, comprising:
a plurality of buffers; and
a processor, the processor being configured to:
store a data packet of a plurality of data packets received from the transmitter in one of the plurality of buffers;
determine whether or not at least a predetermined number of buffers are in use; and
notify the transmitter if it is determined that at least the predetermined number of buffers are in use,
wherein the plurality of buffers are insufficient to store the plurality of data packets.

21. The receiver of claim 20, being configured to receive data based on a hybrid automatic repeat request (HARQ) scheme.

22. A transmitter for transmitting data to a receiver, the receiver being configured to send a notification signal based on a number of buffers in use by the receiver, the transmitter comprising:
a processor configured to determine whether or not to transmit a data packet of a plurality of data packets in a schedule interval, based on the notification signal received from the receiver,
wherein the receiver includes insufficient buffers to store the plurality of data packets.

* * * * *